United States Patent
Kim (10) Patent No.: US 10,889,292 B2
(45) Date of Patent: Jan. 12, 2021

(54) APPARATUS AND METHOD FOR RESTRICTING NON-DRIVING RELATED FUNCTIONS OF VEHICLE

(71) Applicants: Hyundai Motor Company, Seoul (KR); Kia Motors Corporation, Seoul (KR)

(72) Inventor: Sung Un Kim, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/518,236

(22) Filed: Jul. 22, 2019

(65) Prior Publication Data

US 2020/0282979 A1    Sep. 10, 2020

(30) Foreign Application Priority Data

Mar. 5, 2019    (KR) .................... 10-2019-0025352

(51) Int. Cl.
| | |
|---|---|
| *B60Q 1/00* | (2006.01) |
| *B60W 30/085* | (2012.01) |
| *B60W 30/095* | (2012.01) |
| *B60W 40/09* | (2012.01) |
| *B60W 40/08* | (2012.01) |

(52) U.S. Cl.
CPC ...... *B60W 30/085* (2013.01); *B60W 30/0956* (2013.01); *B60W 40/09* (2013.01); *B60W 2040/0818* (2013.01)

(58) Field of Classification Search
CPC .............. B60W 30/085; B60W 40/09; B60W 30/0956; B60W 2040/0818
USPC ...................................................... 340/425.5
See application file for complete search history.

(56) References Cited

U.S. PATENT DOCUMENTS

| | | | |
|---|---|---|---|
| 2014/0214313 A1* | 7/2014 | Lorenz ................... | G08B 21/02 701/301 |
| 2017/0282717 A1* | 10/2017 | Jang ....................... | B60K 37/06 |

* cited by examiner

*Primary Examiner* — Tanmay K Shah
(74) *Attorney, Agent, or Firm* — Mintz Levin Cohn Ferris Glovsky and Popeo, P.C.; Peter F. Corless (57) ABSTRACT

An apparatus and a method for supporting safe driving of a vehicle are provided. The apparatus includes a detector that detects surrounding information of the vehicle and state information of a driver. A processor determines whether attention of the driver is dispersed based on the state information of the driver when entrance of the vehicle into a dangerous driving situation is determined based on the surrounding information and restricts use of a convenience function in the vehicle based on whether the attention of the driver is dispersed.

19 Claims, 6 Drawing Sheets

APPARATUS AND METHOD FOR RESTRICTING NON-DRIVING RELATED FUNCTIONS OF VEHICLE

CROSS-REFERENCE TO RELATED APPLICATION

This application claims the benefit of priority to Korean Patent Application No. 10-2019-0025352, filed on Mar. 5, 2019, the entire contents of which are incorporated herein by reference.

TECHNICAL FIELD

The present disclosure relates to an apparatus and a method for supporting the safe driving of a vehicle and, more particularly, to an apparatus and method that restrict the use of a non-driving related function based on a state of the driver and surrounding environment of the driver.

BACKGROUND

Advanced Driver Assistance Systems (ADAS) detect a collision risk of a vehicle and control the steering and/or braking of the vehicle, or output a warning (alert) to allow a driver to respond to a dangerous situation, thereby assisting the driver in safe driving. In particular, such a system detects the surrounding environment of the driver, for example, the collision risk of the driver regardless of the state of the driver, performs a specified logic based on the surrounding environment, or the collision risk, and controls the behavior of the vehicle, thereby assisting the driver in safe driving.

However, in the related art, an accident may occur due to the attention dispersion of the driver when the driver performs a function (e.g., non-driving related function), such as a telephone conversation function, which is not related to the driving. Even though the driver gazes forward, the cognitive load may be caused to the driver, and thus, the driver is less attentive and may respond slower to the dangerous situation.

SUMMARY

The present disclosure provides an apparatus and a method for supporting the safe driving of a vehicle, which restricts the use of a non-driving related function based on the state of a driver as well as a surrounding environment of the driver. The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, an apparatus for supporting safe driving of a vehicle may include a detector configured to detect surrounding information of the vehicle and state information of a driver, and a processor to determine whether attention of the driver is dispersed, based on the state information of the driver when entrance of the vehicle into a dangerous driving situation is determined based on the surrounding information and to restrict use of a convenience function in the vehicle based on whether the attention of the driver is dispersed.

The detector may be configured to detect, as the surrounding information, a relative speed and a relative position of a surrounding object of the vehicle using at least one of an ultrasonic sensor, a radar, a LiDAR, and a camera. The processor may be configured to calculate a time to collision (TTC) between the vehicle and the surrounding object using the relative speed and the relative position of the surrounding object, and determine that the vehicle has entered the dangerous driving situation when the calculated time to collision is less than a preset time. The processor may then be configured to output a warning in response to determining that the vehicle has entered the dangerous driving situation.

The detector may further be configured to detect a driver image, which is obtained using a camera, as the state information of the driver. The processor may be configured to recognize a gaze of the driver from the driver image to determine whether the attention of the driver is dispersed. The processor may also be configured to determine a convenience function that the driver is using and restrict use of the convenience function, when the attention of the driver is determined as being dispersed. Additionally, the processor may be configured to determine whether a driver assistance function is in an inactive state when the attention of the driver is determined as being dispersed and activate the driver assistance function when the driver assistance function is in the inactive sate. The processor may be configured to cancel the restriction of the convenience function when the dangerous driving situation of the vehicle is terminated. The convenience function may include at least one of hands-free, air conditioning operation, window opening/closing, sunroof opening/closing, and multimedia reproducing and/or navigation.

According to another aspect of the present disclosure, a method for supporting safe driving of a vehicle may include detecting surrounding information of the vehicle, determining whether the vehicle has entered a dangerous driving situation, based on the surrounding information, determining whether attention of the driver is dispersed, based on state information of a driver, when the entrance of the vehicle into the dangerous driving situation is determined, and restricting use of a convenience function in the vehicle based on whether the attention of the driver is dispersed.

The detecting of the surrounding information of the vehicle may include detecting, as the surrounding information, a relative speed and a relative position of a surrounding object of the vehicle using at least one of an ultrasonic sensor, a radar, a light detection and ranging (LiDAR), and a camera. The determining of whether the vehicle has entered the dangerous driving situation may include calculating a time to collision between the vehicle and the surrounding object using the relative speed and the relative position of the surrounding object, and determining that the vehicle has entered the dangerous driving situation when the time to collision is less than a preset time.

The determining of whether the vehicle has entered the dangerous driving situation may include outputting a warning in response to determining that the vehicle has entered the dangerous driving situation. Additionally, the determining of whether the vehicle has entered the dangerous driving situation may include determining whether a driver assistance function is in an inactive state in response to determining that the vehicle has entered the dangerous driving situation, and activating the driver assistance function when the driver assistance function is in the inactive sate.

The determining of whether the attention of the driver is dispersed may include detecting a driver image, which is obtained using a camera, as the state information of the driver, and recognizing a gaze of the driver from the driver image to determine whether the attention of the driver is dispersed. The restricting of the use of the convenience function in the vehicle may include detecting a cause of the attention dispersion of the driver in response to determining that the attention of the driver is dispersed, and restricting use of a convenience function corresponding to the cause of the attention dispersion of the driver.

The detecting of the cause of the attention dispersion of the driver may include identifying a convenience function that the driver is using. The method may further include canceling the restriction of the use of the convenience function when the dangerous driving situation of the vehicle is terminated, after restricting the use of the convenience function in the vehicle. The convenience function may include at least one of hands-free, air conditioning controlling, window opening/closing, sunroof opening/closing, multimedia reproducing and navigation.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, some exemplary embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the exemplary embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

The present disclosure discloses a technology of determining whether a current environment is a driving environment in which a driver has to pay attention (e.g., attentive driving is required), to ensure driving safety, of determining whether the attention of the driver is dispersed when the current environment is an attentive driving environment, and detecting the cause of the attention dispersion of the driver in response to determining that the attention of the driver is dispersed, thereby restricting the use of the function causing the attention dispersion of the driver.

Figure 1:
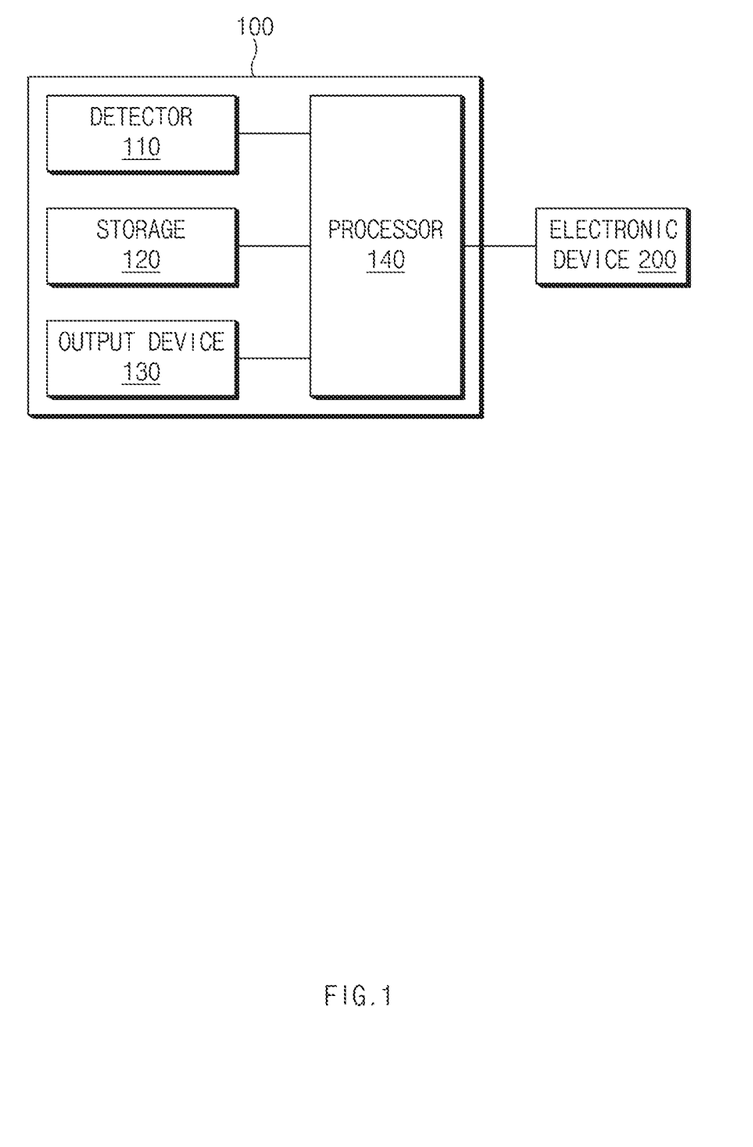
FIG. 1 is a block diagram illustrating an apparatus for supporting the safe driving of a vehicle, according to an exemplary embodiment of the present disclosure.
Figure 2:
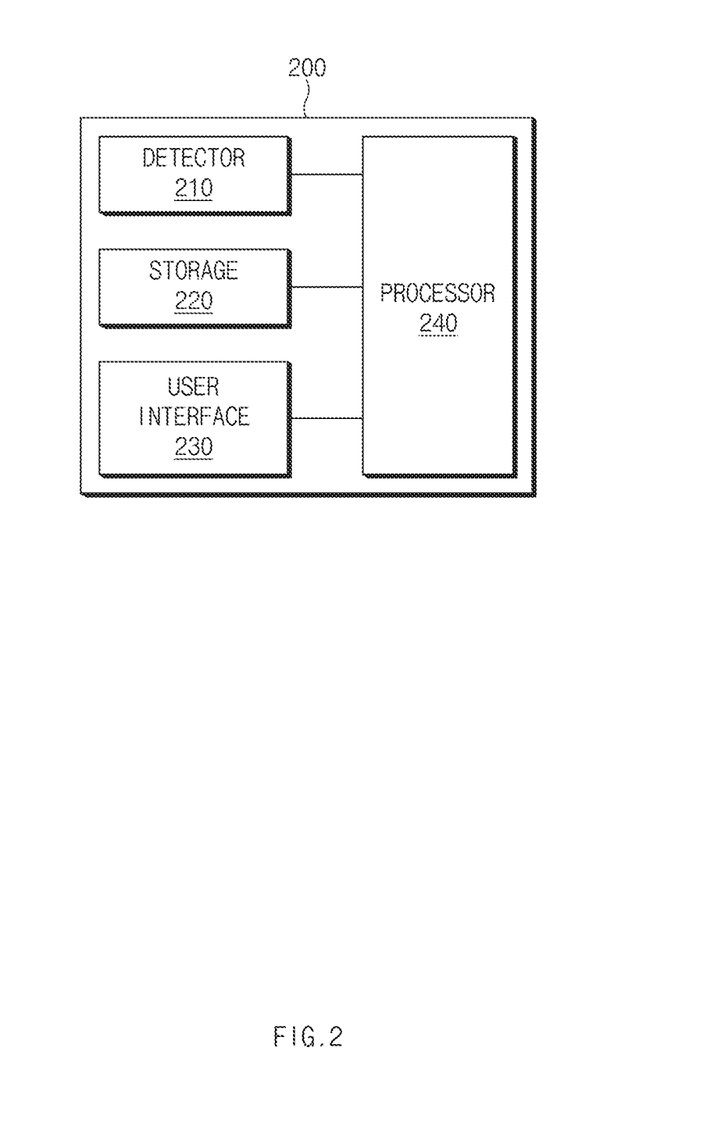
FIG. 2 is a block diagram illustrating an electronic device illustrated in FIG. 1 according to an exemplary embodiment of the present disclosure.

FIG. 1 is a block diagram illustrating an apparatus for supporting the safe driving of a vehicle, according to an exemplary embodiment of the present disclosure, and FIG. 2 is a block diagram illustrating an electronic device illustrated in FIG. 1. Referring to FIG. 1, an apparatus (hereinafter, referred to as "vehicle safe driving supporting apparatus") 100 for supporting the safe driving of a vehicle may include a detector 110, a storage 120, an output device 130, and a processor 140. The various components may all be operated by an overall controller mounted within the vehicle.

In particular, the detector 110 may be configured to detect surrounding information of the vehicle and state information of a driver. The detector 110 may be configured to detect an object (e.g., a surrounding object) around the vehicle and detect the relative speed and the relative position of the surrounding object using at least one of an ultrasonic sensor, a radar (radio detecting and ranging), a LiDAR (light detection and ranging), and a camera. For example, the surrounding object may include a surrounding vehicle and a pedestrian. The detector 110 may be configured to transmit, to the processor 140, surrounding information including the relative speed and/or the relative position of the surrounding object. The surrounding information may further include distance information between the vehicle and the surrounding object, which is detected using at least one of an ultrasonic wave, the radar, and the LiDAR.

The ultrasonic sensor may be configured to generate an ultrasonic wave to detect the surrounding object, and measure the distance between the vehicle and the surrounding object. The radar may be configured to generate an electromagnetic wave and receive an electromagnetic wave reflected from the surrounding object to identify the distance, the direction, and the altitude with respect to the surrounding object. The LiDAR may be configured to scan a laser pulse to measure the arrival time of the laser pulse reflected from the surrounding object, thereby calculating the spatial position coordinates of a reflection point to identify the distance from the surrounding object and the shape of the surrounding object. The camera may be installed on a front portion, rear portion, and/or side portion of the vehicle to acquire a surrounding image, that is, an external image of the vehicle.

Further, the detector 110 may be configured to obtain a driver image, that is, the state information of the driver, using a camera (driver monitoring camera) mounted to face a user (that is, a driver) seated on a driver seat inside the vehicle. The camera may be implemented with at least one of image sensors, such as a charge coupled device (CCD) image sensor, a complementary metal oxide semi-conductor (CMOS) image sensor, a charge priming device (CPD) image sensor, and a charge injection device (CID) image sensor. The camera may include at least one of lenses such as a standard lens, an ultra-wide angle lens, a wide angle lens, a zoom lens, a close-up lens, a telephoto lens, a fish-eye lens, and a quasi-fish-eye lens. In addition, the camera may include an image processor configured to perform image processing such as noise reduction, color reproduction, file compression, image quality adjustment, and saturation adjustment with respect to the image acquired through the image sensor.

The storage 120 may be configured to store software programmed such that the processor 140 performs a specified operation (e.g., the controller in which the processor and storage are housed may be specifically programmed to execute the software). In particular, the storage 120 may be configured to store a collision risk determining algorithm, a gaze tracking algorithm, and a driver attention dispersion determining algorithm. The storage 120 may also be configured to store the surrounding information of the vehicle and the state information of the driver, detected by the detector 110. In other words, the storage 120 may be configured to store information acquired by the ultrasonic sensor, the radar, the LiDAR, the camera, or the like. The storage 120 may be configured to store setting information (e.g., reference time) and the like.

The storage 120 may be implemented with at least one of storage media (recording media) such as a flash memory, a hard disk, a Security Digital (SD) card, a Random Access Memory (RAM), a Static Random Access Memory (SRAM), a Read Only Memory (ROM), a Programmable Read Only Memory (PROM), an Electrically Erasable and Programmable ROM (EEPROM), an Erasable and Programmable ROM (EPROM), a register, and the like.

Further, the storage 120 may be configured to store a lookup table such as table 1 below obtained by representing, using numeric values, the occurrence degree of attention dispersion resulting from the use of the convenience function, the occurrence degree of attention dispersion resulting from the gaze direction of the driver, the occurrence degree of attention dispersion resulting from the dangerous situation in driving, and the prevention degree of attention dispersion resulting from the operation of an advanced driver assistance system (ADAS), that is, the activation of the assistant function of the driver. The ADAS includes a Lane Keeping Assist System (LKAS), an advanced smart cruise control (Adapted Cruise Control; ACC) and an automatic driving system.

TABLE 1

| Convenience function | Occurrence degree of attention dispersion | Gaze direction of driver | Occurrence degree of attention dispersion | Dangerous situation | Occurrence degree of attention dispersion | ADAS | Preventing degree of attention dispersion |
|---|---|---|---|---|---|---|---|
| During multimedia reproduction | −5 (Auditory disturbance) | Front gaze (0 degree) | 0 | Front vehicle not present | 0 | LKAS | +5 |
| During hands-free call | −5 (Auditory disturbance) | Side gaze (±10 degrees) | −5 | Within 50 m from front vehicle | −5 | ACC | +5 |
| During navigation guidance | −15 (Auditory and visual disturbances) | Side gaze (+20 degrees) | −10 | Within 20 m from front vehicle | −10 | ASCC | +10 |

TABLE 1-continued

| Convenience function | Occurrence degree of attention dispersion | Gaze direction of driver | Occurrence degree of attention dispersion | Dangerous situation | Occurrence degree of attention dispersion | ADAS | Preventing degree of attention dispersion |
|---|---|---|---|---|---|---|---|
| Window and/or roof open | −10 (Auditory and tactile disturbances) | Side gaze (+30 degrees) | −20 | Within 10 m from front vehicle | −20 | Autonomous driving | +30 |

The output device 130, configured to output a progress status of the operation of the processor 140, and a result from the operation of the processor 140, may include a display device, an audio output device, and the like. The display device may be implemented with at least one of a liquid crystal display (LCD), a thin film transistor-liquid crystal display (TFT LCD), an organic light-emitting diode (OLED) display, a flexible display, a 3D display, a transparent display, a head-up display (HUD), a touch screen, and a cluster. The audio output device may be configured to output audio data stored in the storage 120. The audio output device may include a receiver, a speaker, and/or a buzzer.

The processor 140 may be configured to execute the overall operation of the vehicle safe driving supporting apparatus 100. The processor 140 may be implemented with at least one of an Application Specific Integrated Circuit (ASIC), a Digital Signal Processor (DSP), Programmable Logic Devices (PLD), Field Programmable Gate Arrays (FPGAs), a Central Processing unit (CPU), microcontrollers, and microprocessors.

Further, the processor 140 may be configured to detect the surrounding information of the vehicle using the detector 110 when the vehicle starts travelling. The detector 110 may be configured to detect the surrounding object of the vehicle using at least one of the ultrasonic sensor, the radar, a LiDAR, and a camera. The detector 110 may further be configured to detect the relative speed and the relative position of the detected surrounding object, and transmit the detected relative speed and relative position to the processor 140.

The processor 140 may be configured to determine whether the vehicle enters a dangerous driving situation, based on the surrounding information. The processor 140 may then be configured to calculate the degree of dangerous driving of the vehicle using the relative speed and/or the relative position of the surrounding object. Additionally, the processor 140 may be configured to determine that the dangerous driving situation is caused when the calculated driving dangerous degree exceeds a threshold value. In other words, the processor 140 may be configured to calculate the time to collision (TTC) between the vehicle and the surrounding object based on the relative speed and/or the relative position (e.g., the distance between the vehicle and the surrounding object) of the surrounding object.

The processor 140 may be configured to determine the degree of dangerous driving based on the calculated time to collision (TTC). The processor 140 may be configured to determine that the vehicle has entered the dangerous driving situation when the degree of dangerous driving exceeds the threshold value. When the degree of dangerous driving is equal to or less than the threshold value, the processor 140 may be configured to determine that the vehicle does not enter the dangerous driving situation, that is, the vehicle is in a safe driving situation. The processor 140 may be configured to detect the state information of the driver using the detector 110 when the vehicle enters the driving dangerous situation. In particular, the detector 110 may be configured to acquire a driver image using a driver monitoring camera, and provide the acquired driver image as the state information of the driver, to the processor 140. The processor 140 may then be configured to track the position of a driver gaze or the movement of the driver based on the driver image. The processor 140 may be configured to determine that the attention of the driver is dispersed when the tracked driver gaze is out of or beyond an observation area.

Furthermore, the processor 140 may be configured to determine that the attention of the driver is not dispersed (e.g., the state that the driver is concentrating on driving) when the tracked driver gaze is within the observation area. In particular, the observation area is an area determined or set based on the position where the dangerous driving situation is detected. When the processor 140 detects the dangerous driving situation, the processor 140 may be configured to determine an area having a specified size as the observation area, based on the detected position where the corresponding dangerous driving situation is detected. For example, the observation area may be an area having a specified size based on the position of the surrounding object potentially colliding with the vehicle based on the surrounding information of the vehicle.

When the attention dispersion of the driver is detected, the processor 140 may be configured to determine the cause of the attention dispersion. In other words, the processor 140 may be configured to determine whether there is a convenience function that the driver is using or operating. The convenience function (e.g., the non-driving related function), which is a function that is not related to the driving of the vehicle, may include hands-free (related to a mobile device), air conditioning operation, window opening/closing, sunroof opening/closing, multimedia (music, video, or radio) reproducing and/or navigation. The present disclosure, however, is not limited to these convenience functions and other functions may be contemplated.

The processor 140 may be configured to determine the use of the relevant convenience function as the cause of the attention dispersion, when the driver is operating one of the convenience functions. The processor 140 may be configured to restrict the use of the convenience function determined as the cause of the attention dispersion. The processor 140 may also be configured to maintain the convenience function to be restricted until the dangerous driving situation of the vehicle is terminated. For example, the processor 140 may be configured to restrict the change of a radio channel or a volume control even if the driver attempts to change the radio channel or to control a volume when the vehicle has entered the dangerous driving situation. The processor 140 may then be configured to cancel or release the restriction of the convenience function when the dangerous driving situation of the vehicle is terminated (e.g., the vehicle has pass through the dangerous driving area or has passed a potential collision zone).

Additionally, the processor 140 may be configured to restrict the use of all convenience functions when the vehicle enters the dangerous driving situation. The processor 140 may then be configured to cancel the restriction of use of all the convenience functions when the dangerous driving situation disappears (e.g., the vehicle enters a lower risk driving region). In addition, the processor 140 may be configured to determine whether a driver assistance function is in an inactive state, when the attention dispersion of the driver is detected. In particular, the driver assistance function for the driver may include a Lane Keeping Assist System (LKAS), an Advanced Smart Cruise Control (ASCC), a Blind Spot Detection (BSD), and/an Autonomous Emergency Braking (AEB) function, and the like. The processor 140 may be configured to activate the relevant driver assistance function when the driver assistance function of the driver is in the inactive state. The processor 140 may be configured to maintain the driver assistance function in an active state until the dangerous driving situation of the vehicle is terminated. The processor 140 may then be configured to deactivate the driver assistance function when the dangerous driving situation is terminated.

Further, the processor 140 may be configured to determine whether to restrict the convenience function that the driver is using, based on a look-up table stored in the storage 120. In particular, the processor 140 may be configured to restrict the use of the relevant convenience function when the occurrence degree of attention dispersion resulting from the use of the convenience function by the driver exceeds a reference numeric value range. In addition, the processor 140 may be configured to select a convenience function, which is to be restricted in use, of convenience functions that the driver is using, when the drive is using at least two convenience functions. The processor 140 may further be configured to select the convenience function, which is to be restricted in use, based on the type (e.g., auditory disturbance, visual disturbance, tactile disturbance, etc.) of the attention dispersion, which is stored in the storage 120, caused for each convenience function. For example, when the driver uses at least two convenience functions, the processor 140 may be configured to select convenience functions, which causes the visual disturbance, of the at least two convenience functions, as a target to be restricted in use.

When the driver uses at least two convenience functions, the processor 140 may reference to the look-up table of Table 1 to identify the occurrence degree of attention dispersion caused by the use of each convenience function, and may be configured to calculate the sum of occurrence degrees of attention dispersion. The processor 140 may be configured to restrict the use of the convenience function in a predetermined (preset) restriction order when the sum of the occurrence degrees of attention dispersion is less than a threshold value (e.g., −20). In particular, the restriction order may be set as the descending order of coefficients causing attention dispersion or set by a user.

As described above, when the sum of occurrence degrees of the attention dispersion is decreased to a threshold numeric value or less due to at least one convenience function that the driver is using, the processor 140 may be configured to restrict the use of at least one convenience function to increase the sum of the occurrence degrees of the attention dispersion. Meanwhile, when the sum of occurrence degrees of the attention dispersion is decreased to the threshold numeric value or less due to the at least one convenience function that the driver is using, the processor 140 may be configured to operate at least one of driver assistance functions to increase the occurrence degree of the attention dispersion.

The electronic device 200 may be configured to perform a specific function (e.g., the non-driving related function) which is not related to the driving through a convenience device mounted within the vehicle. For example, the specific function may include hands-free control of a mobile device, air conditioning operation, window opening/closing, sunroof opening/closing, multimedia (music, video, or radio) reproducing and/or navigation. Although FIG. 1 illustrates one electronic device 200 for the convenience of explanation, a vehicle may be equipped with a plurality of electronic devices 200 to perform mutually different convenience functions.

Additionally, the electronic device 200 may be configured to perform the vehicle safe driving supporting apparatus 100 through an In-vehicle network (IVN). In particular, the IVN is implemented with a Controller Area Network (CAN), a Media Oriented Systems Transport (MOST) network, a Local Interconnect Network (LIN) and/or an X-by-Wire (Flexray). The electronic device 200 may include a communication device 210, a storage 220, a user interface 230, and a processor 240 as illustrated in FIG. 2.

The communication device 210 may communicate by wire or wirelessly together with an external device (e.g., a smartphone, a tablet, or other mobile device). The communication device 210 may employ wireless Internet such as wireless LAN (WLAN) WiFi, wireless broadband (Wibro), and/or World Interoperability for Microwave Access (Wimax), or short-range wireless communication such as Bluetooth, near field communication (NFC), radio frequency identification (RFID) and/or infrared data association (IrDA). The communication device 210 may employ wired communication such as a universal serial bus (USB).

The storage 220 may be configured to store a program to execute the operation of the processor 240 and store input and/or output data. The storage 220 may be implemented with at least one of storage media (recording media) such as a flash memory, a hard disk, a Security Digital (SD) card, a Random Access Memory (RAM), a Static Random Access Memory (SRAM), a Read Only Memory (ROM), a Programmable Read Only Memory (PROM), an Electrically Erasable and Programmable ROM (EEPROM), an Erasable and Programmable ROM (EPROM), a register, a detachable disk, and a web storage.

The user interface 230, configured to receive data from a user, may be implemented by a keyboard, a keypad, a button, a switch, a touch pad, and/or a touch screen. The user interface 230 may be configured to receive a voice signal of the user using an in-vehicle microphone. The processor 240 may be configured to operate the electronic device 200 and may be implemented with at least one of an Application Specific Integrated Circuit (ASIC), a Digital Signal Processor (DSP), Programmable Logic Devices (PLD), Field Programmable Gate Arrays (FPGAs), a Central Processing unit (CPU), microcontrollers, and microprocessors.

Furthermore, the processor 240 may be configured to enter a safe driving mode in response to receiving a signal for informing that the vehicle enters the dangerous driving situation of the vehicle, from the processor 140 of the vehicle safe driving support apparatus 100. In other words, the processor 240 holds the operation of the electronic device 200. For example, when the vehicle enters the dangerous driving situation during a telephone conversation using a hands-free function of a mobile device, the processor 240 may hold the telephone conversation (e.g. place the call on hold) based on the instruction of the processor 140 of the vehicle safe driving supporting apparatus 100.

Meanwhile, the processor 240 may be configured to receive the degree of dangerous driving from the vehicle safe driving supporting apparatus 100 and determine whether to enter the safe driving mode based on the degree of dangerous driving. When the processor 240 receives, from the processor 140 of the vehicle safe driving supporting apparatus 100, notification of the end of the dangerous driving situation of the vehicle, the processor 240 may resume the operation that has been held. For example, the processor 240 may resume the held telephone conversation when receiving a notification message of informing the end of the dangerous driving situation of the vehicle from the vehicle safe driving supporting apparatus 100.

Figure 3:
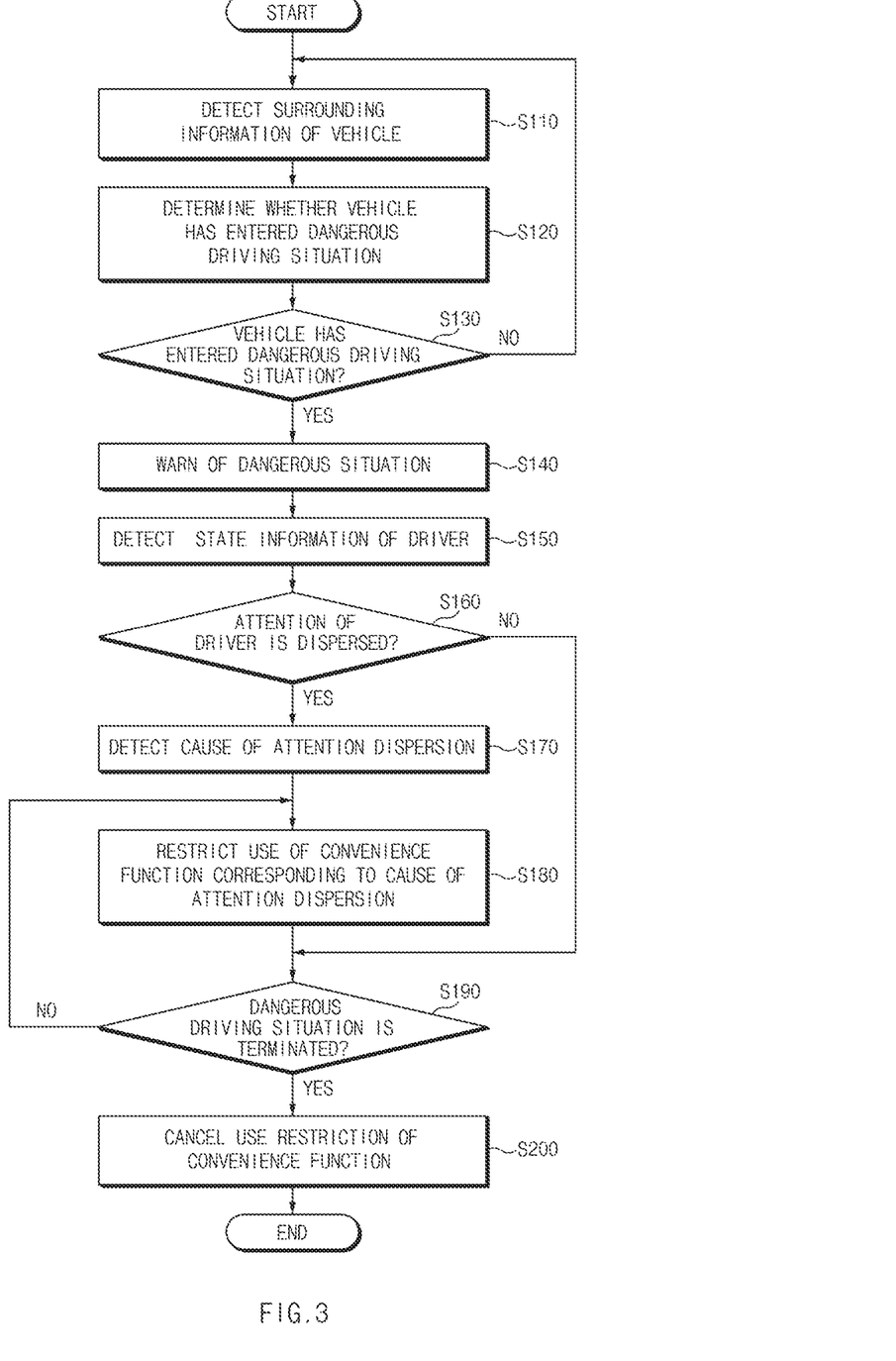
FIG. 3 is a flowchart illustrating a method for supporting the safe driving of a vehicle, according to an exemplary embodiment of the present disclosure.

FIG. 3 is a flowchart illustrating a method for supporting the safe driving of the vehicle, according to an exemplary embodiment of the present disclosure. The processor 140 may be configured to detect the surrounding information of the vehicle using the detector 110 while the vehicle is being driven (S110). The processor 140 may be configured to detect the relative speed and the relative position of the surrounding object of a vehicle using the detector 110.

The processor 140 may then be configured to determine whether the vehicle has entered a dangerous driving situation based on the surrounding information of the vehicle (S120). The processor 140 may be configured to calculate the time to collision (TTC) based on the relative speed and the relative position of the surrounding object, and determine whether the vehicle has entered the dangerous driving situation based on the calculated TTC. The processor 140 may be configured to output a warning regarding a dangerous situation (S140) in response to determining that the vehicle has entered the dangerous driving situation (S130). In particular, the processor 140 may be configured to output a voice message, a warning sound, and/or visual information for warning the dangerous driving situation, to the output device 130.

The processor 140 may be configured to detect the state information of the driver using the detector 110 in response to determining that the vehicle is in the dangerous driving situation (S150). The processor 140 may be configured to acquire the image of the driver using the detector 110. Additionally, the processor 140 may be configured to determine whether the attention of the driver is dispersed, based on the state information of the driver (S160). In particular, the processor 140 may be configured to track the gaze of the driver by analyzing the image of the driver. The processor 140 may be configured to determine whether the attention of the driver is dispersed, based on whether the tracked gaze of the driver is out of or beyond the observation area. Although the present exemplary embodiment has been described in that the processor 140 tracks the gaze of the driver, the processor 140 may also be configured to receive the gaze tracking result from the a monitoring device (not illustrated) of the driver.

When the attention the driver is determined as being dispersed, the processor 140 may be configured to detect the cause of the attention dispersion (S170). The processor 140 may be configured to detect the convenience function resulting in the attention dispersion when the gaze of the driver is beyond the observation area for a specific time or more. Further, the processor 140 may be configured to restrict the use of the convenience function corresponding to the cause of the attention dispersion (S180). Particularly, the processor 140 may be configured to restrict the handling and/or execution of the convenience function resulting in the attention dispersion. In other words, the processor 140 may be configured to restrict the operation of the electronic device by intervening in the operation control of the electronic device 200 that provides the convenience function.

For example, when the driver is performing a hands-free call in the dangerous driving situation (e.g., region, zone, or the like), the processor 140 may be configured to determine the cause of the attention dispersion as the hands-free call, and restrict the operation of the electronic device 200 providing the hands-free function to hold the hands-free call. The processor 140 may be configured to determine whether the dangerous driving situation is terminated (S190). In other words, the processor 140 may be configured to detect when the vehicle is out of the dangerous driving situation (e.g., has driven beyond the risk area). The processor 140 may then be configured to cancel the restriction in the use of the convenience function when the dangerous driving situation of the vehicle is terminated.

Figure 4:
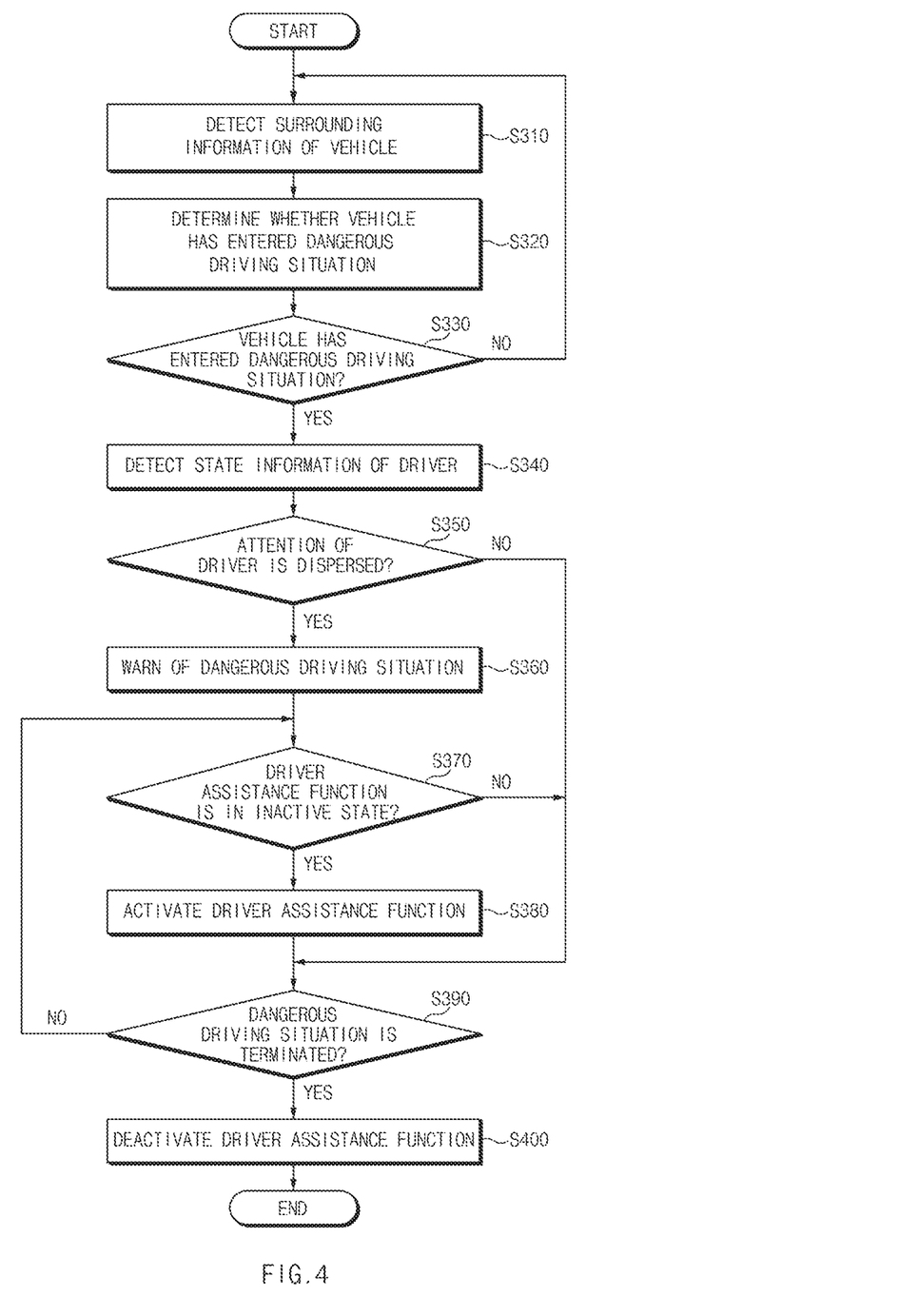
FIG. 4 is a flowchart illustrating a method for supporting the safe driving of a vehicle, according to an exemplary embodiment of the present disclosure.

FIG. 4 is a flowchart illustrating a method for supporting the safe driving of a vehicle, according to another exemplary embodiment of the present disclosure. The processor 140 may be configured to detect the surrounding information of the vehicle using the detector 110 while the vehicle is being driven (S310). The processor 140 may be configured to determine whether the vehicle has entered a dangerous driving situation based on the surrounding information of the vehicle (S320). For example, the processor 140 may be configured to detect, as the dangerous driving situation, that the distance (interval) between the vehicle and the front vehicle is less than the safe distance (e.g., high collision risk), or a traffic jam in front of the vehicle, based on the surrounding information.

The processor 140 may be configured to detect the state information of the driver using the detector 110 in response to determining that the vehicle has entered the dangerous driving situation (S340). The processor 140 may be configured to determine whether the attention of the driver is dispersed, based on the state information of the driver (S350). In other words, the processor 140 may be configured to determine the state of the driver when the vehicle enters the dangerous driving situation. The processor 140 may then be configured to output a warning to provide a notification regarding the dangerous driving situation when the attention of the driver is determined as being dispersed (S360).

Further, the processor 140 may be configured to determine whether the assistance function of the driver is in the inactive state, when the attention of the driver is dispersed (S370). The processor 140 may be configured to output the warning and determine whether the driver assistance function is in the inactive state. The processor 140 may be configured to activate the relevant driver assistance function when the driver assistance function is in the inactive state (S380). For example, the processor 140 may be configured to activate a blind spot detection (BSD) function using the electronic device when the setting of the BSD function is released. The processor 140 may then be configured to determine whether the dangerous driving situation of the driver is terminated (S390). The processor 140 may be configured to deactivate the driver assistance function when the dangerous driving situation is terminated (S400). For example, the processor 140 may be configured to operate the electronic device to release the setting of the BSD when the dangerous driving situation of the vehicle is terminated.

Figure 5:
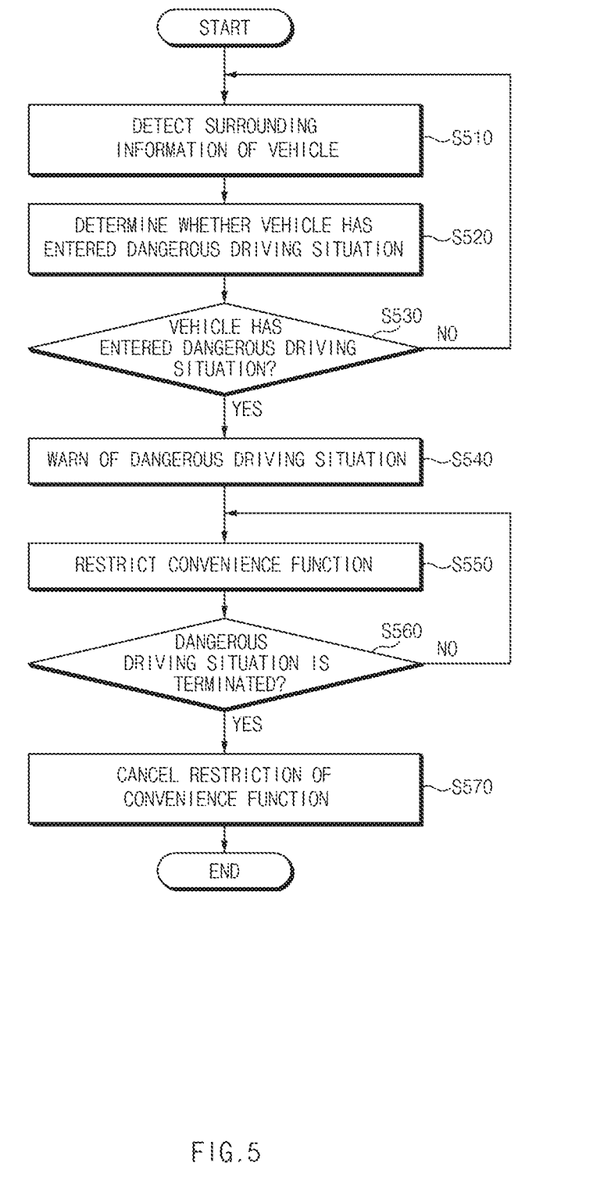
FIG. 5 is a flowchart illustrating a method for supporting the safe driving of a vehicle, according to an exemplary embodiment of the present disclosure.

FIG. 5 is a flowchart illustrating a method for supporting the safe driving of a vehicle, according to still another exemplary embodiment of the present disclosure. The processor 140 may be configured to detect the surrounding information of the vehicle using the detector 110 (S510). The processor 140 specifically be configured to detect the surrounding information of the vehicle using at least one of an ultrasonic sensor, a radar, a LiDAR, and a camera. The processor 140 may then be configured to determine whether the vehicle has entered a dangerous driving situation, based on the surrounding information of the vehicle (S520). In particular, the processor 140 may be configured to determine whether a driving environment of the vehicle is the dangerous driving situation that a driver has to pay attention (e.g., an attentive driving region), based on the information detected by the detector 110.

The processor 140 may be configured to output a warning regarding a dangerous situation (S540) in response to determining that the vehicle has entered the dangerous driving situation (S530). For example, the processor 140 may be configured to determine a current situation as the dangerous driving situation when the current situation is a traffic jam occurring in front of the vehicle or the distance from the front vehicle is rapidly narrowed. Accordingly, the processor 140 may be configured to output voice information or visual information to provide a notification regarding the risk of the handling of the electronic device 200 such as a radio and/or an air conditioning in the vehicle. The processor 140 may be configured to restrict the use of all convenience functions in the vehicle (S550). The processor 140 may be configured to output a warning regarding a dangerous situation while operating the electronic device 200 to restrict the use of all convenience functions. The processor 140 may be configured to determine whether the dangerous driving situation is terminated (S560) and cancel the restriction in the use of the convenience function when the dangerous driving situation of the vehicle is terminated (S570).

Figure 6:
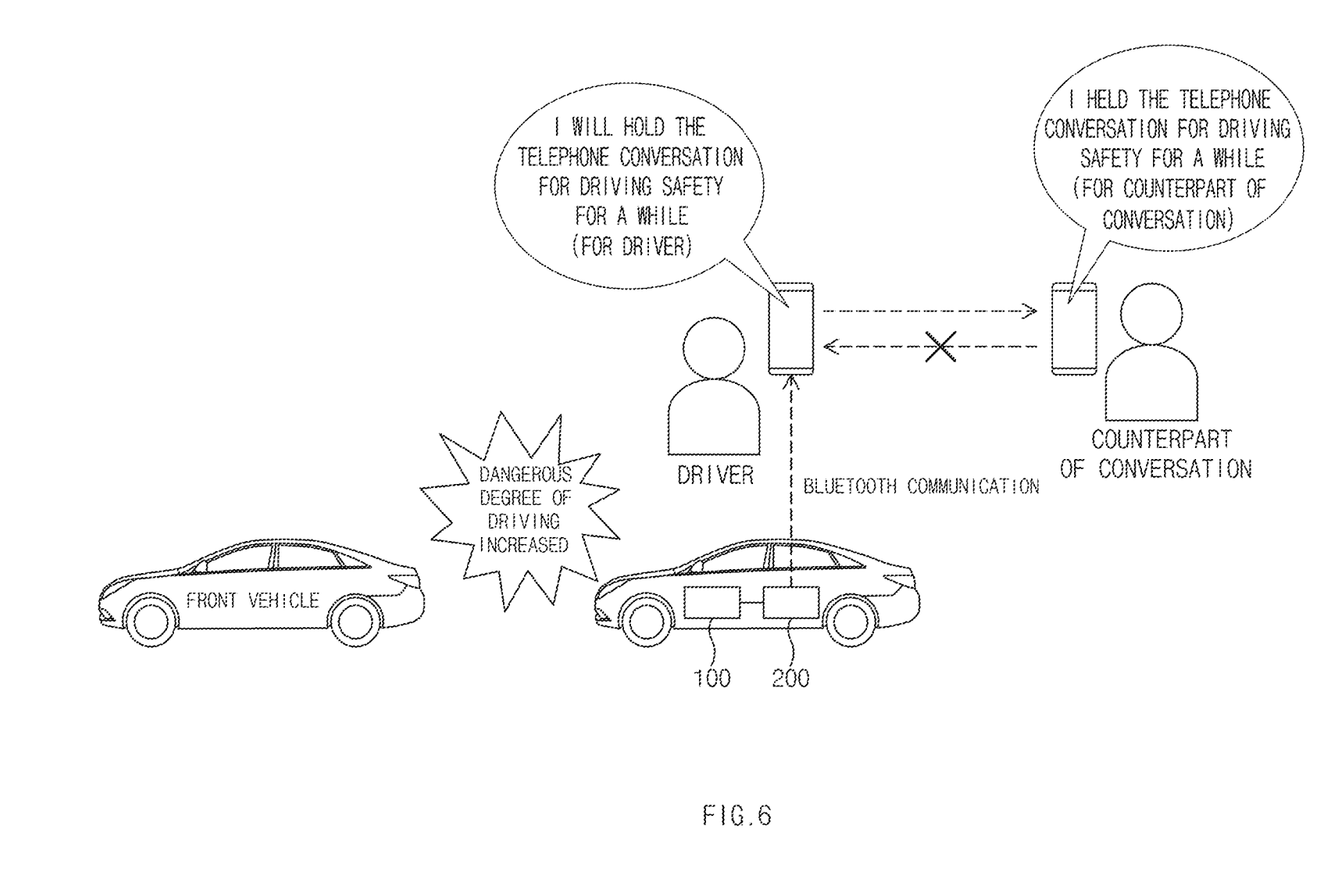
FIG. 6 is a view illustrating the safe driving of the vehicle, according to an exemplary embodiment of the present disclosure.

FIG. 6 is a view illustrating the safe driving of the vehicle, according to the present disclosure. The electronic device supports a hands-free function to allow the driver to conduct a telephone conversation when a call is received while the vehicle is being driven. The vehicle safe driving supporting apparatus 100 may be configured to detect, as a dangerous situation, that the distance between the front vehicle and the vehicle is less than a safe distance while the driver makes the telephone conversation. The vehicle safe driving supporting apparatus 100 may then be configured to output a warning regarding the dangerous situation and detect the state of the driver.

The vehicle safe driving supporting apparatus 100 may be configured to hold the telephone call by operating the electronic device 200 when the driver continues conducting the telephone conversation even though there is a warning of the dangerous situation. In particular, the vehicle safe driving supporting apparatus 100 may be configured to transmit, to the driver, a message such as "I will hold the telephone conversation for safe driving" before holding the telephone conversation. In addition, the vehicle safe driving supporting apparatus 100 may be configured to transmit, to the counterpart of the conversation, a message such as "I held the telephone conversation for the safe driving of the counterpart".

Thereafter, the vehicle safe driving supporting apparatus 100 may allow the driver to resume the telephone conversation by operating the electronic device 200 when the dangerous driving situation of the vehicle is terminated. According to the present disclosure, the use of the non-driving related function (i.e., convenience function) may be restricted based on the state of the driver as well as the surrounding environment, thereby allowing the safe driving of the vehicle and ensuring the safety of the driver.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims. Therefore, the exemplary embodiments of the present disclosure are provided to explain the spirit and scope of the present disclosure, but not to limit them, so that the spirit and scope of the present disclosure is not limited by the exemplary embodiments. The scope of the present disclosure should be construed on the basis of the accompanying claims, and all the technical ideas within the scope equivalent to the claims should be included in the scope of the present disclosure.

What is claimed is:

1. An apparatus for supporting safe driving of a vehicle, comprising:
 a detector configured to detect surrounding information of the vehicle and state information of a driver; and
 a processor configured to:
  determine whether attention of the driver is dispersed, based on the state information of the driver when entrance of the vehicle into a dangerous driving situation is determined based on the surrounding information; and
  restrict use of a convenience function within the vehicle based on whether the attention of the driver is dispersed,
  wherein the processor is configured to select at least one convenience function, which is to be restricted in use, from at least two convenience functions, when the occurrence degree of the attention dispersion is equal to or less than a threshold numeric value, as the driver uses the at least two convenience functions.

2. The apparatus of claim 1, wherein the detector is configured to detect, as the surrounding information, a relative speed and a relative position of a surrounding object of the vehicle using at least one of an ultrasonic sensor, a radar, a LiDAR, and a camera.

3. The apparatus of claim 2, wherein the processor is configured to:
 calculate a time to collision between the vehicle and the surrounding object using the relative speed and the relative position of the surrounding object; and
 determine that the vehicle has entered the dangerous driving situation when the calculated time to collision is less than a preset time.

4. The apparatus of claim 1, wherein the detector is configured to detect a driver image, which is obtained using a camera, as the state information of the driver.

5. The apparatus of claim 4, wherein the processor is configured to detect a gaze of the driver from the driver image to determine whether the attention of the driver is dispersed.

6. The apparatus of claim 5, wherein the processor is configured to determine a convenience function that the driver is using and restrict use of the convenience function, when the attention of the driver is determined as being dispersed.

7. The apparatus of claim 5, wherein the processor is configured to:
 determine whether a driver assistance function is in an inactive state when the attention of the driver is determined as being dispersed; and activate the driver assistance function when the driver assistance function is in the inactive sate.

8. The apparatus of claim 1, wherein the processor is configured to release the restriction of the convenience function when the dangerous driving situation of the vehicle is terminated.

9. The apparatus of claim 1, wherein the convenience function includes at least one selected from the group consisting of: a hands-free function of a mobile device, air conditioning operation, window opening/closing, sunroof opening/closing, and multimedia reproducing and/or navigation.

10. The apparatus of claim 1, further comprising:
a storage configured to store a lookup table obtained by representing, using numeric values, an occurrence degree of attention dispersion resulting from use of a convenience function, an occurrence degree of attention dispersion resulting from a gaze direction of a driver, and an occurrence degree of attention dispersion resulting from a dangerous situation,
wherein the processor is configured to determine whether to restrict a convenience function that the driver is using, based on the lookup table.

11. The apparatus of claim 1, wherein the processor is configured to select the at least one convenience function, which is to be restricted in use, by considering at least one of a type of attention dispersion resulting from each convenience function and an attention dispersion causing coefficient, which are previously defined.

12. A method for supporting safe driving of a vehicle, comprising:
detecting, by a processor, surrounding information of the vehicle;
determining, by the processor, whether the vehicle has entered a dangerous driving situation, based on the surrounding information;
determining, by the processor, whether attention of the driver is dispersed, based on state information of a driver, when the entrance of the vehicle into the dangerous driving situation is determined; and
restricting, by the processor, use of a convenience function in the vehicle based on whether the attention of the driver is dispersed,
wherein the restricting of the use of the convenience function in the vehicle includes selecting, by the processor, at least one convenience function, which is to be restricted in use, from at least two convenience functions, when the occurrence degree of the attention dispersion is equal to or less than a threshold numeric value, as the driver uses the at least two convenience functions.

13. The apparatus of claim 12, wherein the determining of whether the vehicle has entered the dangerous driving situation includes:
calculating, by the processor, a time to collision between the vehicle and the surrounding object using the relative speed and the relative position of the surrounding object; and
determining, by the processor, that the vehicle has entered the dangerous driving situation when the time to collision is less than a preset time.

14. The method of claim 13, wherein the determining of whether the vehicle has entered the dangerous driving situation includes:
determining, by the processor, whether a driver assistance function is in an inactive state in response to determining that the vehicle has entered the dangerous driving situation; and
activating, by the processor, the driver assistance function when the driver assistance function is in the inactive sate.

15. The method of claim 12, wherein the determining of whether the attention of the driver is dispersed includes:
detecting, by the processor, a driver image, which is obtained using a camera, as the state information of the driver; and
recognizing, by the processor, a gaze of the driver from the driver image to determine whether the attention of the driver is dispersed.

16. The method of claim 12, wherein the restricting of the use of the convenience function in the vehicle includes:
detecting, by the processor, a cause of the attention dispersion of the driver in response to determining that the attention of the driver is dispersed; and
restricting, by the processor, use of a convenience function corresponding to the cause of the attention dispersion of the driver.

17. The method of claim 16, wherein the detecting of the cause of the attention dispersion of the driver includes:
identifying, by the processor, a convenience function that the driver is using.

18. The method of claim 17, further comprising:
releasing, by the processor, the restriction of the use of the convenience function when the dangerous driving situation of the vehicle is terminated, after restricting the use of the convenience function in the vehicle.

19. The method of claim 12, wherein the convenience function includes at least one selected from the group consisting of: a hands-free function of a mobile device, air conditioning operation, window opening/closing, sunroof opening/closing, multimedia reproducing and navigation.

* * * * *